(12) United States Patent
Parekh

(10) Patent No.: US 7,493,620 B2
(45) Date of Patent: Feb. 17, 2009

(54) TRANSFER OF WAITING INTERRUPTS

(75) Inventor: Harshadrai G. Parekh, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 887 days.

(21) Appl. No.: 10/871,951

(22) Filed: Jun. 18, 2004

(65) Prior Publication Data

US 2005/0283556 A1  Dec. 22, 2005

(51) Int. Cl.
- *G06F 9/46* (2006.01)
- *G06F 3/00* (2006.01)
- *G06F 13/24* (2006.01)
- *G06F 15/173* (2006.01)

(52) U.S. Cl. ............. 718/105; 718/100; 718/104; 710/1; 710/48; 710/260; 709/225

(58) Field of Classification Search ............ 710/48, 710/260, 1; 718/100, 104, 105; 709/225
See application file for complete search history.

(56) References Cited

U.S. PATENT DOCUMENTS

| | | | |
|---|---|---|---|
| 4,982,404 A | 1/1991 | Hartman | |
| 5,515,538 A | 5/1996 | Kleiman | |
| 5,530,875 A * | 6/1996 | Wach | 710/264 |
| 5,553,293 A | 9/1996 | Andrews et al. | |
| 5,925,115 A | 7/1999 | Ponte | |
| 5,987,538 A | 11/1999 | Tavallaei et al. | |
| 6,085,277 A | 7/2000 | Nordstrom et al. | |
| 6,189,065 B1 * | 2/2001 | Arndt et al. | 710/260 |
| 6,205,508 B1 | 3/2001 | Bailey et al. | |
| 6,223,228 B1 | 4/2001 | Ryan et al. | |
| 6,360,243 B1 | 3/2002 | Lindsley et al. | |
| 6,480,966 B1 | 11/2002 | Rawson, III | |
| 6,574,673 B1 | 6/2003 | Hari et al. | |
| 7,117,285 B2 * | 10/2006 | Ota | 710/265 |
| 2004/0019723 A1 * | 1/2004 | Ostrovsky et al. | 710/260 |

FOREIGN PATENT DOCUMENTS

| | | | |
|---|---|---|---|
| JP | 09259070 A | * | 10/1997 |
| JP | 2003140900 A | * | 5/2003 |

OTHER PUBLICATIONS

Silberschatz et al., "Operating System Concepts", 1999, John Wiley & Sons, Fifth Edition, pp. 114-116, 402, 511-512.*

IBM, "A method to improve interrupt response latency for multi-processor system", IP.com, Feb. 9, 2004, pp. 1-2.*

Hennett, PP et al., "Programmable Routin of Interrupts in a Multi-processor Network", IP.com, Aug. 1, 1982, pp. 1-2.*

Morimitsu, "Interruption control system for several input-output devices uses interruption controller with software that monitors waiting time counted after receiving interruption request from one input-output device connected through control line", Oct. 3, 1997, Derwent Abstract for JP 09259070 A.*

Morimitsu, Machine Translation for JP 09259070 A. 1997.*

* cited by examiner

*Primary Examiner*—Meng-Ai An
*Assistant Examiner*—Kenneth Tang

(57) ABSTRACT

Apparatus and methods are provided for transferring interrupts. One embodiment of a computing device includes a first processor, a memory in communication with the first processor, and computer executable instructions stored in memory and executable on the first processor. The computer executable instructions are provided to select an interrupt, that has been waiting to be processed, for transfer from the first processor, check a number of other processors to select a second processor that has a short wait time for processing the interrupt, and transfer the interrupt from the first processor to the second processor.

17 Claims, 4 Drawing Sheets

TRANSFER OF WAITING INTERRUPTS

INTRODUCTION

In computing devices and systems, computer executable instructions are used to execute program applications. Interrupt signals are computer executable instructions that are used to interrupt a program application temporarily in order to act on the interrupt signal. An interrupt signal indicates to the computing device or system that an event has occurred and that the computing device or system is to take a specified action.

Interrupt signals can come from a variety of sources. For example, in many devices and systems, a keystroke generates an interrupt signal. Interrupts can also be generated by other devices in a system, such as a printer connected to a computing device. These interrupts are often called hardware interrupts.

In contrast, interrupt signals initiated by program applications are often called software interrupts. Software interrupts can also be referred to as traps or exceptions. There are many different types of interrupts that can be used in devices and systems. Personal computers (PCs), for example, usually support 256 types of software interrupts and 15 hardware interrupts.

Timeout interrupts (also referred to as timeouts or callouts) are one type of interrupt. Timeouts can be implemented using software and/or hardware interrupts. Timeouts are generated by a program application or device, that has waited a certain length of time for some input but has not received it. Program applications use timeouts, for example, so that the program application does not wait for input that may not come. For example, a security program application in a computing device can perform a timeout if you do not enter your password quickly enough.

Timeouts are frequently used to end an incomplete task when the timeout is executed by a processor. For example, if an action has not occurred in a specified amount of time, the timeout can direct the computing device to end the waiting loop so that the request can be reinitiated or terminated. Timeouts are common in communications applications in order to free up a line or port that is tied up with a request that has not been answered in a reasonable amount of time. For each situation in which a timeout is used there is a default length of time before the timeout is initiated. In some devices these time periods can be adjusted by the user or network administrator.

When processing interrupts, different interrupts can be given a priority to help in deciding which interrupt should be processed first. Timeout interrupts, for example, are generally given a low priority for processing by a processor. Timeouts that are waiting to be processed are usually arranged in a queue and wait until there are no higher priority interrupts to be processed. At that point the first timeout is processed and when finished, the processor moves to the next timeout unless a higher priority interrupt is waiting to be processed.

In some devices, there can be a large number of interrupts that take priority over the timeouts. Such delays in processing interrupts can also slow applications or aid in causing device and/or system malfunctions.

DETAILED DESCRIPTION

Computing device and system designs have evolved to include operating systems that distribute execution of computer executable instructions among several processors. Such devices and systems are generally called "multi-processor systems". In some multi-processor systems, the processors share memory and a clock.

In various multi-processor systems, communication between processors can take place through shared memory. In other multi-processor systems, each processor has its own memory and clock and the processors communicate with each other through communication channels such as high-speed buses or telephone lines, among others.

Figure 2:
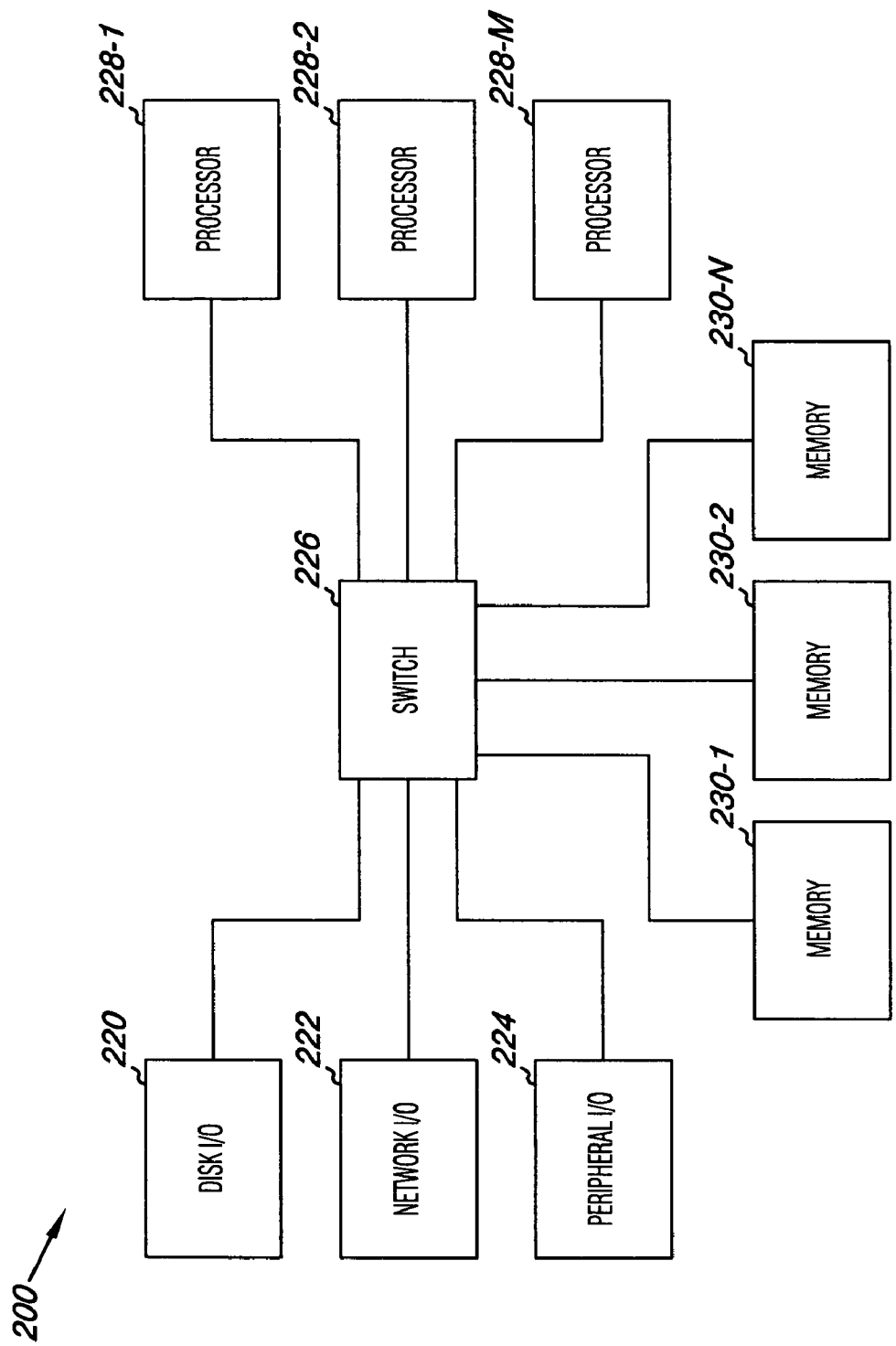
FIG. 2 illustrates an exemplary multiprocessor system.

An illustration of a multi-processor system is shown in FIG. 2 and will be described in more detail below. In such configurations, the execution of computer executable instructions can be assigned to particular processors. This assignment, of what computer executable instructions are processed by what processor, is usually accomplished by software or firmware within the device or system.

However, situations can arise where one processor is overloaded and a bottleneck is created in the processing of the instructions that are waiting to be executed by the processor. As one of ordinary skill in the art will appreciate from reading this disclosure, interrupts can be among the program instructions waiting to be executed. As mentioned above, interrupts can be assigned a priority in order for the device or system to determine which interrupt to process first. The priorities can be established, for instance, by the manufacturer and/or by a user, such as a device or system administrator, among others.

Priorities can be established in various manners as those of ordinary skill in the art will appreciate. For instance, clock interrupts may be defined as the highest priority, then I/O interrupts, and then timeout interrupts.

The need for interrupts arises from the fact that, in many cases, input and output can not proceed in parallel with processor execution. Because the processor can generally execute many hundreds of thousands, millions, or more instructions during the time required to complete a single I/O instruction, it is wasteful to have the processor idle during this time. Interrupts allow the processor to execute the program application concurrently with the I/O instructions and can thereby be signaled as soon as the I/O instructions are completed. For example, a program application may instruct a peripheral device connected to the computer system to begin a data transfer and, once completed, the device provides an interrupt to indicate completion of the data transfer.

As described above, a processor can have the responsibility for handling the interrupts generated by an I/O component, such as a removable memory storage device. For example, an instruction could be given to download a 1 gigabyte file from the removable memory storage device to a fixed memory component within a computing device. During this process, the processor will interact with the removable and fixed memory components to read and then write portions of the file from one memory component to the other. This involves the use of a large number of I/O interrupts that may use all of the available processing time available on the processor.

If the same processor is also responsible for executing timeout interrupts, and if the timeout interrupts have been assigned a lower priority, it may be that few or none of the timeout interrupts that have expired and are waiting to execute can be executed. The expired timeouts remain in the queue until the processor is available to process them at which time it may be too late for the timeout to be applicable to its intended task.

The expiration of interrupts can be identified in a variety of manners. For example, the interrupt can have an expiration time assigned thereto and the expiration time can be measured against a current time kept by a computing system or device. The expiration time can also be measured based upon an elapsed time since the interrupt was placed in the queue or created.

Embodiments of the present invention allow interrupts that are queued for execution by a first processor to be migrated for execution by one or more other processors if the first processor is busy processing other interrupts. In this way, lower priority interrupts can be processed more quickly. This function can be accomplished in a number of manners, as will be described below with respect to FIGS. 3 and 4.

Embodiments of the present invention include computer executable instructions which can execute to manage low priority interrupts, such as timeouts, on a system or device having multiple processors, such as a network server or other suitable device. In this way, low priority interrupts do not have to wait for a particular processor to become available.

Rather, the low priority interrupts can be shifted from a busy processor to a processor that is available or may be available in a shorter timeframe than the processor for which the low priority interrupts have been waiting. Embodiments can, therefore, increase the speed and efficiency of a multi-processor system or device by utilizing resources that are available to process timeouts or other low priority interrupts, instead of having them wait until the processor for which they are waiting becomes available.

Although the description of the embodiments illustrated herein is generally directed toward the handling of timeouts, those of ordinary skill in the art will appreciate from reading this disclosure that other low priority interrupts can also be handled in the same way as described herein and that the present invention is not limited to the handling of timeouts.

Figure 1:
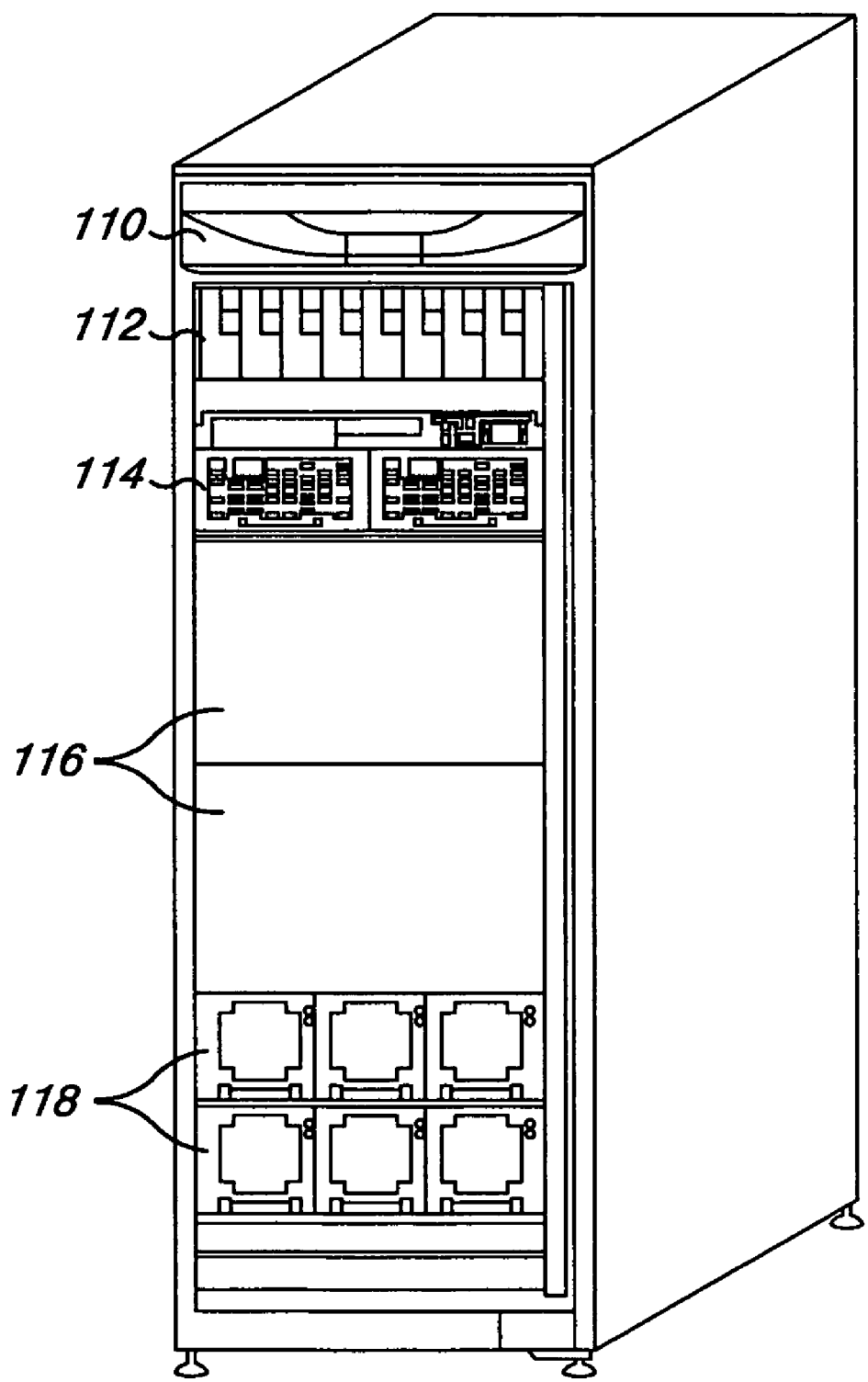
FIG. 1 illustrates an example of a multiprocessor computing device.

FIG. 1 illustrates an example of a multiprocessor computing device for handling timeouts. The computing device 100 includes a user control panel 110, memory 112, a number of Input/Output (I/O) components 114, a number of processors 116, and a number of power supplies 118.

Computing device 100 can be any device that can execute computer executable instructions. For example, computing devices can include desktop personal computers (PCs), workstations, and/or laptops, among others.

A computing device 100 can be generally divided into three classes of components: hardware, operating system, and program applications. The hardware, such as a processor (e.g., one of a number of processors), memory, and I/O components, each provide basic computing resources.

Embodiments of the invention can also reside on various forms of computer readable mediums. Those of ordinary skill in the art will appreciate from reading this disclosure that a computer readable medium can be any medium that contains information that is readable by a computer. For example, the computing device 100 can include memory 112 which is a computer readable medium. The memory included in the computing device 100 can be of various types, such as ROM, RAM, flash memory, and/or some other types of volatile and/or nonvolatile memory.

The various types of memory can also include fixed or portable memory components, or combinations thereof. For example, memory mediums can include storage mediums such as, but not limited to, hard drives, floppy discs, memory cards, memory keys, optically readable memory, and the like.

Operating systems and/or program applications can be stored in memory. An operating system controls and coordinates the use of the hardware among a number of various program applications executing on the computing device or system. Operating systems are a number of computer executable instructions that are organized in program applications to control the general operation of the computing device. Operating systems include Windows, Unix, and/or Linux, among others, as those of ordinary skill in the art will appreciate.

Program applications, such as database management programs, software programs, business programs, and the like, define the ways in which the resources of the computing device are employed. Program applications are a number of computer executable instructions that process data for a user. For example, program applications can process data for such computing functions as managing inventory, calculating payroll, assembly and management of spreadsheets, word processing, managing network and/or device functions, and other such functions as those of ordinary skill in the art will appreciate from reading this disclosure.

As shown in FIG. 1, embodiments of the present invention can include a number of Input/Output (I/O) components 114. Computing devices can have various numbers of I/O components and each of the I/O components can be of various different types. These I/O components can be integrated into a computing device 100 and/or can be removably attached, such as to an I/O port. For example, I/O components can be connected via serial, parallel, Ethernet, and Universal Serial Bus (USB) ports, among others.

Some types of I/O components can also be referred to as peripheral components or devices. These I/O components are typically removable components or devices that can be added to a computing device to add functionality to the device and/or a computing system. However, I/O components include any component or device that provides added functionality to a computing device or system. Examples of I/O components can be printing devices, scanning devices, faxing devices, memory storage devices, network devices (e.g., routers, switches, buses, and the like), and other such components.

I/O components can also include user interface components such as display devices, including touch screen displays, keyboards and/or keypads, and pointing devices such as a mouse and/or stylus. In various embodiments, these types of I/O components can be used in compliment with the user control panel 110 or instead of the user control panel 110.

In FIG. 1, the computing device 100 also includes a number of processors 116. Processors are used to execute computer executable instructions that make up operating systems and program applications. Processors are used to process interrupts and can include executable instructions including hierarchies for prioritizing and processing the interrupts.

According to various embodiments of the invention, a processor can also execute instructions regarding transferring an interrupt from one processor to another, as described herein, and criteria for selecting when to transfer an interrupt. These computer executable instructions can be stored in memory, such as memory 112, for example.

FIG. 2 illustrates an illustration of an exemplary multiprocessor system. The system 200 of FIG. 2 includes a number of I/O components 220, 222, and 224, a switch 226, a number of processors 228-1 to 228-M, and a number of memory components 230-1 to 230-N.

The designators "N" and "M" are used to indicate that a number of processors and/or memory components can be attached to the system 200. The number that N represents can be the same or different from the number represented by M.

The system 200 of FIG. 2 includes a disk I/O component 220, a network I/O component 222, and a peripheral I/O component 224. The disk I/O component 220 can be used to connect a hard disk to a computing device. The connection between the disk I/O component 220 and processors 228-1 to 228-M allows information to be passed between the disk I/O component and one or more of the processors 228-1 to 228-M.

The embodiment illustrated in FIG. 2 also includes a network I/O component 222. Network I/O components can be used to connect a number of computing and/or peripheral devices within a networked system or to connect one networked system to another networked system. The network I/O component 222 also can be used to connect the networked system 200 to the Internet.

System 200 of FIG. 2 also includes a peripheral I/O component 224. The peripheral I/O component 224 can be used to connect one or more peripheral components to the processors 228-1 to 228-M. For example, a computing system can have fixed or portable external memory devices, printers, keyboards, displays, and other such peripherals connected thereto.

The embodiment of FIG. 2 also includes a switch 226, a number of processors 228-1 to 228-M, and a number of memory components 230-1 to 230-N. The switch 226 can be used to direct information between the I/O components 220, 222, and 224, the memory components 230-1 to 230-N, and the processors 228-1 to 228-M. Those of ordinary skill in the art will understand that the functionalities of the switch 226 can be provided by one or more components of a computing device and do not have to be provided by an independent switching device or component as is illustrated in FIG. 2.

Various multiprocessor systems include a single computing device having multiple processors, a number of computing devices each having single processors, or multiple computing devices each having a number of processors. For example, computing systems can include a number of computing devices (e.g., computing device 100 of FIG. 1) that can communicate with each other.

The embodiments of the present invention, for example, can be useful in systems and devices where the processors operate under a single operating system. In this way, the operating system can monitor the interrupts and can control the transfer thereof.

Those of ordinary skill in the art will appreciate from reading this disclosure that the embodiments of the present invention are not constrained to the exemplary devices and systems illustrated in FIGS. 1 and 2 and that other configurations, component orientations, and architectures can be used with the various embodiments disclosed herein.

Figure 3:
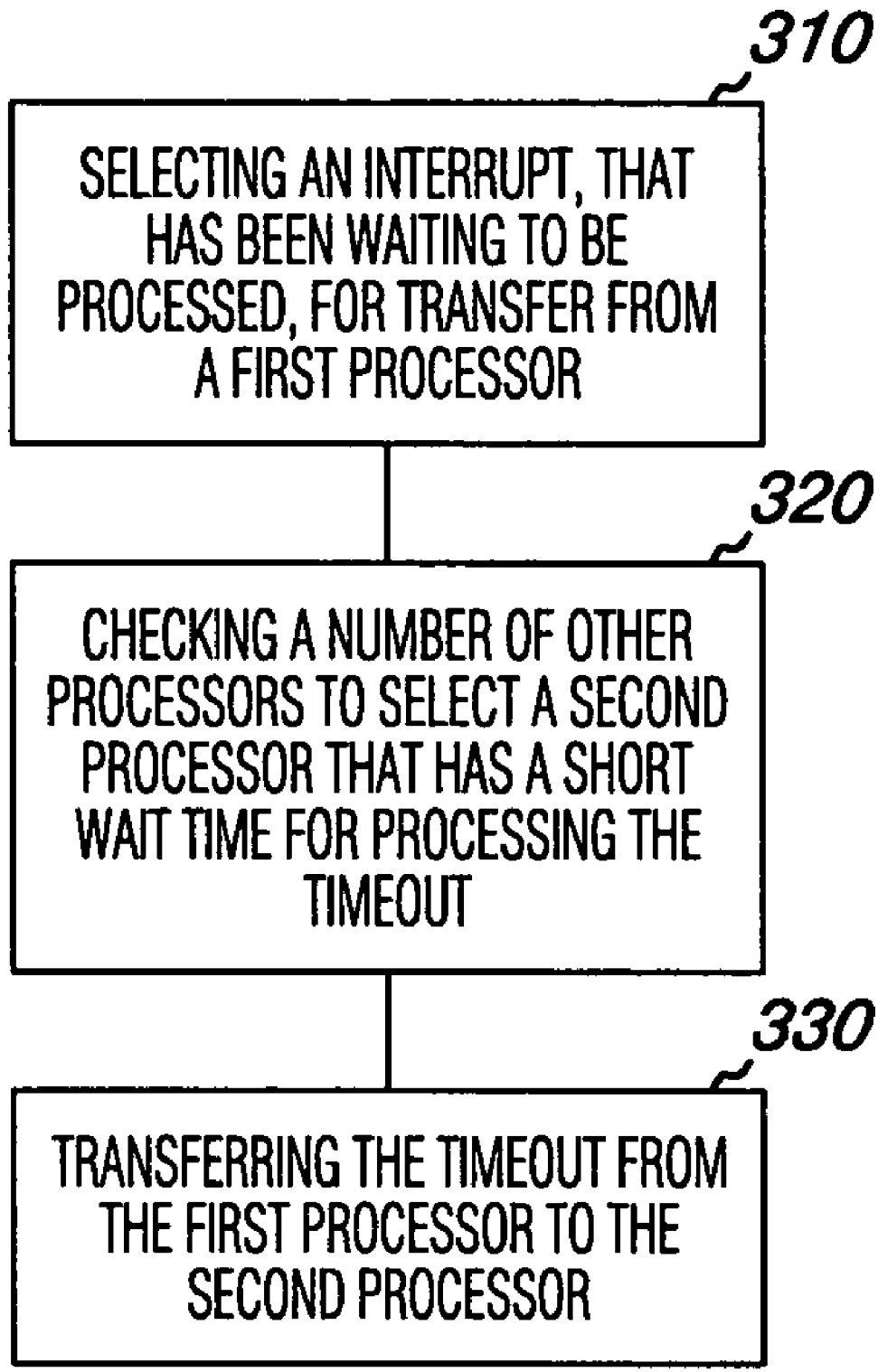
FIG. 3 illustrates a method embodiment for handling interrupts.
Figure 4:
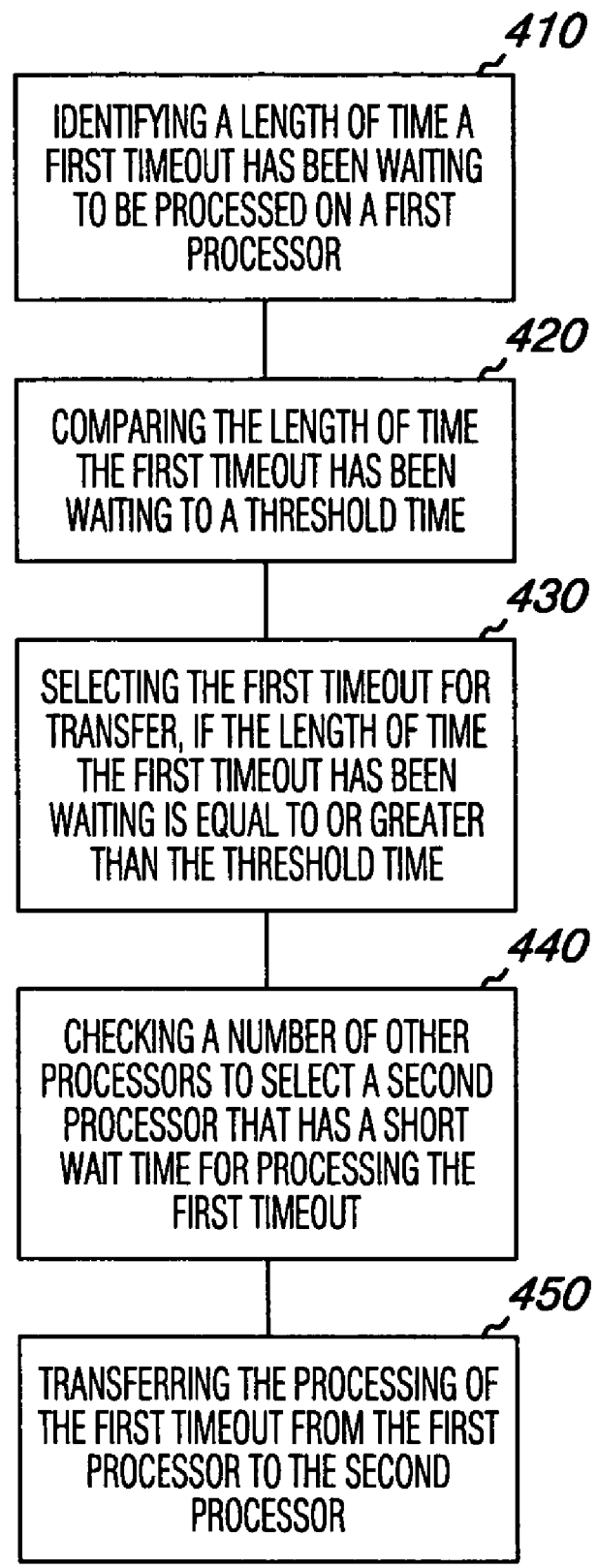
FIG. 4 illustrates another method embodiment for handling interrupts.

FIGS. 3 and 4 illustrate various method embodiments for handling interrupts. As one of ordinary skill in the art will understand, the embodiments can be performed by software/firmware (e.g., computer executable instructions) operable on the devices shown herein or otherwise. The embodiments of the invention, however, are not limited to any particular operating environment or to software written in a particular programming language. Software, application modules, and/or computer executable instructions, suitable for carrying out embodiments of the present invention, can be resident in one or more devices or locations or in several locations.

Unless explicitly stated, the method embodiments described herein are not constrained to a particular order or sequence. Additionally, some of the described method embodiments or elements thereof can occur or be performed at the same point in time.

FIG. 3 illustrates one method embodiment for processing an interrupt. In block 310, the method of FIG. 3 includes selecting an interrupt, that has been waiting to be processed, for transfer from a first processor. The selection of an interrupt can, for example, be based upon whether an expiration time for processing the interrupt has expired, among other criteria. The method also includes checking a number of other processors to select a second processor that has a short wait time for processing the interrupt, at block 320.

Those of ordinary skill in the art will appreciate from reading the present disclosure that the wait time can be measured in various ways and a short wait time can be determined based upon information provided by a processor or can be a fixed amount. For example, it can be determined that a wait time is short because the wait time on the second processor is shorter than the wait time for the first processor. A short wait time can also be a fixed quantity that is, for example, preset by the manufacturer, user, and/or administrator.

In such embodiments, a number of processors can be selected as processors that can accommodate the interrupts to be transferred. And, therefore, the queued interrupts can be disbursed among the second and other processors in order to reduce the load that is transferred to any one processor. However, the invention is not so limited.

Additionally, in various embodiments, the selection of the second processor can be based upon the detection of an empty expired list or other such queue within a computing device or system. In various embodiments, the number of processors can be queried to identify if a queue is empty. Embodiments are also provided that can use computer executable instructions to check the wait time on a processor to determine the length of wait that an interrupt may have in the queue of the processor. This information can, for example, be compared to a threshold wait time to determine whether the wait time is too long for a particular interrupt of set of interrupts.

The method also includes transferring the interrupt from the first processor to the second processor, at block 330. In various embodiments, sets of interrupts can be transferred to the second and/or other processors.

In various embodiments, the method can also include notifying the second processor that the interrupt has been transferred to the second processor. In this way, the second processor will be aware that the interrupts are waiting and can address them more quickly.

Various embodiments also include transferring a set of interrupts. For example, computer executable instructions can execute to select a set of interrupts for transfer based upon whether the expiration time for processing one of the interrupts of the set has expired. In other embodiments, computer executable instructions can execute to select a set of chronologically organized interrupts for transfer based upon whether an earliest expiration time of a timeout of the set of timeouts has expired.

In this way, if the earliest expiration time (i.e., most recent in time) has expired, then all of the other chronologically listed timeouts placed on the list before the one having an earliest expiration time are also expired. Those of ordinary skill in the art will appreciate that the interrupt with the earliest expiration time of the set may not be the interrupt with the earliest expiration time in the queue, but rather, the set can be defined when an interrupt having an elapsed expiration time is identified.

FIG. 4 illustrates another method embodiment for handling interrupts. In block 410, the method of FIG. 4 includes identifying a length of time an interrupt has been waiting to be processed on a first processor. The method also includes comparing the length of time the interrupt has been waiting to a threshold time, in block 420. Similar to the wait time discussed with respect to FIG. 3, those of ordinary skill in the art will appreciate from reading the present disclosure that the threshold time can be determined based upon information provided by a processor or can be a fixed amount.

At block 430, the method also includes selecting an interrupt for transfer, if the length of time the interrupt has been waiting is equal to or greater than the threshold time. Selecting the processing of the interrupt for transfer can also include selecting all interrupts that have been waiting to be processed for a length of time longer than a first identified interrupt.

The interrupts can also be organized in various forms, such as chronologically or by priority, for example. In such cases, the selection of one or more interrupts can be made in various ways. For example, selecting the processing of an interrupt for transfer can include selecting all interrupts for transfer that are positioned in a queue after a first interrupt.

The interrupts can also be selected based upon their age in the queue. For example, an interrupt that has been identified as expired may not be the only interrupt that has expired. If the interrupts are organized chronologically, all interrupts positioned in the queue before the identified expired interrupt would also be expired since they where placed in the queue before the identified interrupt.

The method also includes checking a number of other processors to select a second processor that has a short wait time for processing the first interrupt, at block 440. In block 450, the method also includes transferring the processing of the first interrupt from the first processor to the second processor. In embodiments where more than one interrupt is selected, the method can include transferring all selected interrupts from the first processor to the second processor.

Transferring the processing of an interrupt can, for example, be accomplished by unlinking a kernel object representing the interrupt from the first processor and linking the kernel object to the second processor. In this way, the transfer can take place as a function within the kernel.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one.

Combination of the above embodiments, and other embodiments not specifically described herein will be apparent to those of ordinary skill in the art upon reviewing the above description. The scope of the various embodiments of the invention includes various other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device, comprising:
   a first processor;
   a memory in communication with the first processor; and
   computer executable instructions stored in memory and executable on the first processor to:
     select a first interrupt, that has been waiting to be processed, for transfer from the first processor based upon an expiration time of the first interrupt that has been passed by a current time of the first processor;
     check a number of other processors in the computing device to select a second processor that has a wait time due to one or more interrupts already in a queue of the second processor, based on an evaluation that the wait time due to the one or more interrupts already in a queue of the second processor is less than a threshold wait time; and
     transfer the first interrupt from the first processor to the second processor.

2. The computing device of claim 1, wherein computer executable instructions for selecting the first interrupt are executable to select a timeout interrupt.

3. The computing device of claim 1, wherein the number of other processors are provided on the computing device.

4. The computing device of claim 1, wherein the first processor is provided on a first computing device and the number of other processors are provided on a number of other computing devices.

5. The computing device of claim 1, wherein the selection of the second processor is based upon a wait time for a second interrupt on the second processor that is less than a threshold wait time.

6. A computing system, comprising:
   a first processor;
   a memory;
   a second processor; and
   computer executable instructions in the memory which are executable to:
     identify a length of time a first interrupt has been waiting to be processed on the first processor;
     compare the length of time the first interrupt has been waiting to a threshold time;
     select the first interrupt for transfer, if the length of time the first interrupt has been waiting is equal to or greater than the threshold time, and therefore whether an expiration time for processing the first interrupt has expired based on a current time of the first processor;
     check a number of other processors to select a second processor that has a wait time, due to one or more interrupts already in a queue of the second processor based on an evaluation that the wait time due to the one or more interrupts already in a queue of the second processor is less than the threshold time; and
     transfer the processing of the first interrupt from the first processor to the second processor.

7. The computing system of claim 6, wherein the computer executable instructions execute to select a set of interrupts for transfer based upon whether an expiration time for processing one of the interrupts of the set of interrupts has expired.

8. The computing system of claim 7, wherein the computer executable instructions execute to transfer the set of interrupts to the second processor.

9. The computing system of claim 6, wherein the computer executable instructions execute to select a set of chronologically organized interrupts for transfer based upon whether an earliest expiration time of an interrupt of the set of interrupts has expired.

10. The computing system of claim 9, wherein the computer executable instructions execute to transfer the set of interrupts to the second processor.

11. The computing system of claim 9, wherein the computer executable instructions execute to transfer the set of interrupts to the second processor and to one or more other processors.

12. A computer readable medium having instructions for causing a device to perform a method, comprising:
selecting a first interrupt, that has been waiting to be processed, for transfer from the first processor based upon whether an expiration time for processing the interrupt has expired based on a current time of the first processor;
checking a number of other processors to select a second processor that has a wait time due to one or more interrupts already in a queue of the second processor based on an evaluation that the wait time due to the one or more interrupts already in a queue of the second processor is less than a threshold wait time; and
transferring the first interrupt from the first processor to the second processor.

13. A method for handling interrupts, comprising:
identifying a length of time a first interrupt has been waiting to be processed on a first processor;
comparing the length of time the first interrupt has been waiting to a threshold time;
selecting the first interrupt for transfer, if the length of time the first interrupt has been waiting is equal to or greater than the threshold time;
selecting all interrupts that have been awaiting processing for a length of time longer than the first interrupt;
checking a number of other processors to select a second processor that has a wait time due to one or more interrupts already in a queue of the second processor based on an evaluation that the wait time due to the one or more interrupts already in a queue of the second processor is less than the threshold time; and
transferring the processing of the first interrupt from the first processor to the second processor.

14. The method of claim 13, wherein transferring the processing of the first interrupt includes transferring all selected interrupts from the first processor to the second processor.

15. The method of claim 13, wherein the first interrupt is represented by a kernel object and wherein transferring the processing of the first interrupt includes unlinking a kernel object representing the first interrupt from the first processor and linking the kernel object to the second processor.

16. The method of claim 13, wherein selecting the processing of the first interrupt for transfer includes selecting all interrupts for transfer that are positioned in a queue after the first interrupt.

17. The method of claim 16, wherein transferring the processing of the first interrupt includes transferring all selected interrupts from the first processor to the second processor.

* * * * *

UNITED STATES PATENT AND TRADEMARK OFFICE
CERTIFICATE OF CORRECTION

PATENT NO. : 7,493,620 B2 Page 1 of 1
APPLICATION NO. : 10/871951
DATED : February 17, 2009
INVENTOR(S) : Harshadrai G. Parekh It is certified that error appears in the above-identified patent and that said Letters Patent is hereby corrected as shown below:

In column 8, line 53, in Claim 6, after "processor" insert -- , --.

In column 9, line 19, in Claim 12, after "processor" insert -- , --.

In column 10, line 8, in Claim 13, after "processor" insert -- , --.

Signed and Sealed this

Twenty-eighth Day of July, 2009

JOHN DOLL
*Acting Director of the United States Patent and Trademark Office*